(12) United States Patent
Beiermann et al.

(10) Patent No.: US 9,415,575 B2
(45) Date of Patent: Aug. 16, 2016

(54) SELF-HEALING LAMINATE SYSTEM

(75) Inventors: Brett A. Beiermann, Champaign, IL (US); Michael W. Keller, Urbana, IL (US); Scott R. White, Champaign, IL (US); Nancy R. Sottos, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 419 days.

(21) Appl. No.: 12/359,631

(22) Filed: Jan. 26, 2009

(65) Prior Publication Data
US 2009/0191402 A1 Jul. 30, 2009

Related U.S. Application Data

(60) Provisional application No. 61/023,698, filed on Jan. 25, 2008.

(51) Int. Cl.
*B32B 5/16* (2006.01)
*B32B 37/12* (2006.01)
(Continued)

(52) U.S. Cl.
CPC ............... *B32B 37/12* (2013.01); *B29C 73/22* (2013.01); *B32B 5/02* (2013.01); *B32B 5/022* (2013.01); *B32B 5/024* (2013.01); *B32B 7/12* (2013.01); *B32B 27/12* (2013.01); *B32B 27/18* (2013.01); *B32B 27/283* (2013.01); *B32B 27/40* (2013.01); *B29C 73/163* (2013.01); *B32B 2037/1253* (2013.01); *B32B 2250/05* (2013.01); *B32B 2250/24* (2013.01); *B32B 2250/40* (2013.01); *B32B 2262/0261* (2013.01); *B32B 2307/51* (2013.01); *B32B 2307/7242* (2013.01); *B32B 2307/7246* (2013.01); *B32B 2307/7265* (2013.01); *B32B 2307/762* (2013.01);
(Continued)

(58) Field of Classification Search
CPC .......... B05D 3/02; B32B 37/14; B32B 27/00; B32B 5/02; B32B 5/16; B32B 2307/546; C08J 5/00; C08F 291/00; C08K 9/10; B29C 73/00; B29C 73/16
USPC ............................. 428/221, 323; 442/64, 181
See application file for complete search history.

(56) References Cited

U.S. PATENT DOCUMENTS

| 1,959,460 A | 5/1934 | Crossan |
| 1,977,281 A | 10/1934 | Knowlton |

(Continued)

FOREIGN PATENT DOCUMENTS

| DE | WO 2006114332 A3 * | 2/2007 | ................ B64C 1/40 |
| WO | 2007009280 | 1/2007 | |

OTHER PUBLICATIONS

Keller, M.W., "An Elastomeric Self-Healing Material," Jun. 4-7, 2006, Proceedings of the 2006 SEM Annual Conference and Exposition on Experimental and Applied Mechanics, Society for Experimental Mechanics, pp. 1-4.*

(Continued)

*Primary Examiner* — Peter Y Choi
(74) *Attorney, Agent, or Firm* — Haukaas Fortius PLLC; Michael H. Haukaas

(57) ABSTRACT

A laminate material may include a first flexible layer, and a self-healing composite layer in contact with the first flexible layer. The composite layer includes an elastomer matrix, a plurality of first capsules including a polymerizer, and a corresponding activator for the polymerizer. The laminate material may self-heal when subjected to a puncture or a tear.

11 Claims, 5 Drawing Sheets

(51) Int. Cl.

| | |
|---|---|
| *B29C 73/22* | (2006.01) |
| *B32B 27/18* | (2006.01) |
| *B32B 5/02* | (2006.01) |
| *B32B 7/12* | (2006.01) |
| *B32B 27/12* | (2006.01) |
| *B32B 27/28* | (2006.01) |
| *B32B 27/40* | (2006.01) |
| *B29C 73/16* | (2006.01) |

(52) U.S. Cl.
CPC ....... *B32B2309/027* (2013.01); *B32B 2309/08* (2013.01); *B32B 2309/105* (2013.01); *B32B 2571/00* (2013.01); *Y10T 156/10* (2015.01); *Y10T 428/249921* (2015.04); *Y10T 428/25* (2015.01)

(56) References Cited

U.S. PATENT DOCUMENTS

| | | | |
|---|---|---|---|
| 2,782,829 A | 2/1957 | Peterson | |
| 2,877,819 A | 3/1959 | Gibbs | |
| 4,919,183 A | 4/1990 | Dobson | |
| 4,978,563 A | 12/1990 | Sandels | |
| 5,099,900 A | 3/1992 | Gomberg | |
| 5,941,480 A * | 8/1999 | Wille | 244/131 |
| 5,984,884 A * | 11/1999 | Alvarez et al. | 602/6 |
| 6,261,360 B1 | 7/2001 | Dry | |
| 6,518,330 B2 | 2/2003 | White et al. | |
| 6,766,817 B2 | 7/2004 | da Silva | |
| 6,858,659 B2 | 2/2005 | White et al. | |
| 7,037,395 B2 | 5/2006 | Saito | |
| 7,566,747 B2 | 7/2009 | Moore et al. | |
| 7,569,625 B2 | 8/2009 | Keller et al. | |
| 7,612,152 B2 | 11/2009 | Braun et al. | |
| 7,723,405 B2 | 5/2010 | Braun et al. | |
| 2004/0007784 A1* | 1/2004 | Skipor et al. | 257/788 |
| 2005/0217932 A1* | 10/2005 | Woodman et al. | 181/290 |
| 2006/0111469 A1 | 5/2006 | White et al. | |
| 2006/0252852 A1 | 11/2006 | Braun et al. | |
| 2008/0299391 A1 | 12/2008 | White et al. | |
| 2008/0305343 A1 | 12/2008 | Toohey et al. | |
| 2009/0181254 A1 | 7/2009 | White et al. | |
| 2009/0302154 A1* | 12/2009 | Groning | B64C 1/403 244/1 N |
| 2010/0206088 A1 | 8/2010 | Potisek et al. | |
| 2011/0039980 A1 | 2/2011 | Caruso et al. | |

OTHER PUBLICATIONS

Keller, Michael, "Fatigue of Self-Healing Elastomers," Apr. 18-20, 2007, Proceedings of the First International Conference on Self-Healing Materials, pp. 1-5.*

Cho, Soo Hyoun, "Polydimethylsiloxane-Based Self-Healing Materials," 2006, Advanced Materials vol. 18, pp. 997-1000.*

Beiermann et al., "Manufacture and testing of a self-healing bladder material (Abstract)", "223rd ACS National Meeting", 2007, Publisher: American Chemical Society, Published in: United States.

Nagaya, et al., "Tire with Self-Repairing Mechanism", 2006, pp. 379-384, vol. 49, No. 2, Publisher: JSME International Journal, Published in: Japan.

Dhoot, S.N. et al., "Barrier Polymers" Encyclopedia of Polymer Science and Technology, John Wiley & Sons, 198-263, 2002.

* cited by examiner

SELF-HEALING LAMINATE SYSTEM

REFERENCE TO RELATED APPLICATIONS

This application claims the benefit of U.S. Provisional Application No. 61/023,698 entitled "Self-Healing Laminate System" filed Jan. 25, 2008, which is incorporated by reference in its entirety.

FEDERALLY SPONSORED RESEARCH OR DEVELOPMENT

The subject matter of this application may have been funded in part under a research grant from the NASA Jet Propulsion Laboratory, under Contract Number JPL 1270900. The U.S. Government may have rights in this invention.

BACKGROUND

Flexible materials are increasingly under development for high performance applications. Examples of applications include inflatable structures, temporary shelters, protective apparel, and films for use as fluid barriers or selective membranes. In one example, lightweight inflatable habitats have been investigated for aerospace applications, such as lunar or other extraterrestrial stations. These structures may include a large flexible membrane that is inflated with a breathable atmosphere, providing an internal living space and defining the overall shape of the structure. Inflatable habitats provide several advantages when compared to conventional rigid structures, such as high strength-to-weight ratio, better damage resistance, and lower manufacturing costs (D. Cadogan et al. *Acta Astronautica* 44, 399 (1999)).

Flexible materials tend to undergo failure due to punctures or tears. This is in contrast to rigid engineering plastics, which tend to experience fatigue or brittle failure. For example, inflatable habitat materials can be damaged by small punctures or tears in the flexible outer layer, including damage due to micrometeoroid and orbital debris (MMOD).

Failure in flexible materials can be especially problematic. Since these materials typically are used to provide flexibility to a system, they may be subjected to repeated stresses during use. Once a puncture or tear is initiated, it may grow quickly if the material is subjected to large and/or frequent stresses. If the puncture or tear is healed by the application of another polymer to the failure site, the properties of the healed material may be impaired if the mechanical properties of the new polymer and the original material are not closely matched.

Previous attempts at healing puncture damage have focused on ionomers and space-filling gels. A self-healing response in an ionomer can be initiated by the transfer of energy when punctured by a fast moving projectile, typically a few millimeters in diameter. Frictional heating of the material from the passage of the projectile can contribute to reorientation of the polymer chains in the ionomer. This rearrangement can, under some conditions, seal the hole generated by the projectile. However, this healing occurs only when the damaged area is heated to near the melt temperature of the material (Kalista, S. J. *Mechanics of Advanced Materials and Structures*, 14, 391 (2007)).

A water-saturated space-filling gel has been proposed for self-healing vehicle tires (Nagaya, K. et al. *JMSE International Journal*, 49, 379 (2006)). In this system, the polymeric gel is bonded between two layers of rubber on the inner surface of a tire and is then saturated with water. Upon puncture, the saturated gel can expand and fill the puncture, sealing the leak. However, a relatively thick polymer layer (4 mm) is required to effectively seal nail puncture damage for typical tire pressures of 0.25 MPa.

It is desirable to provide a flexible material that can self-heal when subjected to a puncture or tear. Ideally, the flexible material can autonomically self-heal, without the need for manual intervention such as heating. The self-healing response may prevent the loss of fluid contained by the flexible material. It is also desirable to provide a flexible material that can maintain most or all of its advantageous properties after it has self-healed.

SUMMARY

In one aspect, the invention provides a laminate material including a first flexible layer, and a self-healing composite layer in contact with the first flexible layer. The composite layer includes an elastomer matrix, a plurality of first capsules including a polymerizer, and a corresponding activator for the polymerizer.

In another aspect, the invention provides a laminate material including a first flexible layer, a second flexible layer, and a self-healing composite layer between the first and second flexible layers. The composite layer includes an elastomer matrix, a plurality of first capsules including a polymerizer, and a plurality of second capsules including a corresponding activator for the polymerizer. At least one of the first and second flexible layers includes a fabric and a barrier material.

In yet another aspect, the invention provides a method of making a laminate material including contacting a first flexible layer with a composite layer, and attaching the first flexible layer and the composite layer. The composite layer includes an elastomer matrix, a plurality of first capsules including a polymerizer, and a corresponding activator for the polymerizer.

In yet another aspect, the invention provides a method of increasing the lifetime of a flexible material including contacting the flexible material with a composite layer, and attaching the flexible material and the composite layer to form a laminate material. The composite layer includes an elastomer matrix, a plurality of first capsules including a polymerizer, and a corresponding activator for the polymerizer. The flexible material is non-self-sealing as measured by the self-sealing test, and the laminate material is self-sealing as measured by the self-sealing test.

The following definitions are included to provide a clear and consistent understanding of the specification and claims.

The term "laminate material" means a material that includes layers of at least two different materials attached to each other.

The term "flexible layer" means a layer of material that can be bent by at least 10 degrees without permanent deformation.

The term "elastomer matrix" means a continuous phase in a material, where the continuous phase includes an elastomer.

The term "elastomer" means a polymeric material that can be strained to at least 100% without failing. Strain of a material is the change in a linear dimension divided by the original value of the linear dimension. A material has undergone failure under stress when the material is permanently deformed and/or can no longer perform its intended function. Examples of failure in polymeric materials include breaking, necking and crazing.

The term "polymeric material" means a material containing at least one polymer.

The term "polymer" means a substance containing more than 100 repeat units. The term "polymer" includes soluble and/or fusible molecules having long chains of repeat units, and also includes insoluble and infusible networks. The term "prepolymer" means a substance containing less than 100 repeat units and that can undergo further reaction to form a polymer.

The term "matrix precursor" means a composition that will form an elastomer matrix when it is solidified. A matrix precursor may include a monomer and/or prepolymer that can polymerize to form an elastomer matrix. A matrix precursor may include an elastomer that is dissolved or dispersed in a solvent, and that can form an elastomer matrix when the solvent is removed. A matrix precursor may include an elastomer at a temperature above its melt temperature, and which can form an elastomer matrix when cooled to a temperature below its melt temperature.

The term "polymerizer" means a composition that will form a polymer when it comes into contact with a corresponding activator for the polymerizer. Examples of polymerizers include monomers of polymers, such as styrene, ethylene, acrylates, methacrylates and dicyclopentadiene (DCPD); one or more monomers of a multi-monomer polymer system, such as diols, diamines and epoxides; prepolymers such as partially polymerized monomers still capable of further polymerization; and functionalized polymers capable of forming larger polymers or networks.

The term "activator" means anything that, when contacted or mixed with a polymerizer, will form a polymer. Examples of activators include catalysts and initiators. A corresponding activator for a polymerizer is an activator that, when contacted or mixed with that specific polymerizer, will form a polymer.

The term "catalyst" means a compound or moiety that will cause a polymerizable composition to polymerize, and that is not always consumed each time it causes polymerization. This is in contrast to initiators, which are always consumed at the time they cause polymerization. Examples of catalysts include silanol condensation catalysts such as titanates and dialkyltincarboxylates. Examples of catalysts also include ring opening polymerization (ROMP) catalysts such as Grubbs catalyst. A corresponding catalyst for a polymerizer is a catalyst that, when contacted or mixed with that specific polymerizer, will form a polymer.

The term "initiator" means a compound or moiety that will cause a polymerizable composition to polymerize and, in contrast to a catalyst, is always consumed at the time it causes polymerization. Examples of initiators include peroxides, which can form a radical to cause polymerization of an unsaturated monomer; a monomer of a multi-monomer polymer system, such as a diol, a diamine, and an epoxide; and amines, which can form a polymer with an epoxide. A corresponding initiator for a polymerizer is an initiator that, when contacted or mixed with that specific polymerizer, will form a polymer.

The term "capsule" means a closed object having an aspect ratio of 1:1 to 1:10, and that may contain a solid, liquid, gas, or combinations thereof. The aspect ratio of an object is the ratio of the shortest axis to the longest axis, where these axes need not be perpendicular. A capsule may have any shape that falls within this aspect ratio, such as a sphere, a toroid, or an irregular ameboid shape. The surface of a capsule may have any texture, for example rough or smooth. Capsules may be hollow, or they may be solid particles.

The term "encapsulant" means a material that will dissolve or swell in a polymerizer and, when combined with an activator, will protect the activator from reaction with materials used to form an elastomer matrix. A corresponding encapsulant for an elastomer matrix and for a polymerizer will protect an activator from reaction with materials used to form that specific elastomer matrix and will dissolve or swell in that specific polymerizer. An encapsulant may be formed into particles in the shape of a capsule.

The term "average" of a dimension of a plurality of capsules means the average of that dimension for the plurality. For example, the term "average diameter" of a plurality of capsules means the average of the diameters of the capsules, where a diameter of a single capsule is the average of the diameters of that capsule. Likewise, the term "average wall thickness" of a plurality of capsules means the average of the wall thicknesses of the capsules, where a wall thickness of a single capsule is the average of the wall thicknesses of that capsule.

The term "adhesion promoter" means a substance that increases the adhesion between two substances, such as the adhesion between two polymers.

BRIEF DESCRIPTION OF THE DRAWINGS

The invention can be better understood with reference to the following drawings and description. The components in the figures are not necessarily to scale, emphasis instead being placed upon illustrating the principles of the invention.

DETAILED DESCRIPTION

A laminate including a self-healing layer can autonomically self-heal when subjected to a puncture or a tear. The self-healing layer may include a polymerizer and an activator for the polymerizer. When the self-healing layer is punctured or torn, the polymerizer and activator can combine and form a polymer, healing the layer. For laminates used to contain a fluid, the presence of a self-healing layer can impart self-sealing properties to the laminate.

Figure 1:
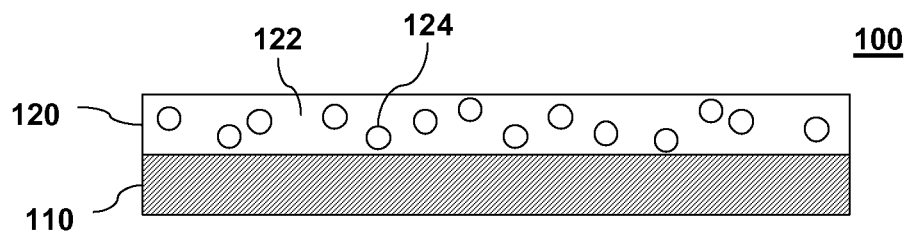
FIG. 1 is a schematic representation of a laminate material that includes a flexible layer, and a self-healing composite layer in contact with the flexible layer.

FIG. 1 is a schematic representation of a laminate material 100 that includes a flexible layer 110, and a self-healing composite layer 120 in contact with the flexible layer. The composite layer 120 includes an elastomer matrix 122, a plurality of first capsules 124 including a polymerizer, and a corresponding activator for the polymerizer. Preferably the laminate material 100 is thin and lightweight, and is flexible over a broad temperature range.

The flexible layer 110 may be any layer of material that can be bent by at least 10 degrees without permanent deformation. Preferably the flexible layer can be bent without permanent deformation by at least 45 degrees, by at least 90 degrees, by at least 135 degrees, or by at least 180 degrees. Examples of flexible layer materials include fabrics and polymer films. Preferably the flexible layer includes a fabric. Examples of fabrics include webs of woven fibers and nonwoven webs. A fabric may include a polymeric binder in addition to the fibers of the web. Fabrics typically undergo puncture or tear failure with little or no permanent deformation. This failure behavior may increase the likelihood of self-sealing of a laminate that includes a fabric, since a polymerizer and an activator at the failure site can come into contact to form a polymer that bonds to the laminate. The flexible layer 110 may include fillers such as particles, fibers and capsules.

The flexible layer 110 preferably includes a barrier material, which restricts the passage of a fluid. The flexible layer may include a gas barrier material, a vapor barrier material and/or a liquid barrier material. Barrier materials are described, for example, in Dhoot, S. N. et al., "Barrier Polymers" *Encyclopedia of Polymer Science and Technology*, John Wiley & Sons, 198-263, 2002.

Examples of barrier materials include polyolefins, such as high density polyethylene (HDPE), low density polyethylene (LDPE), polypropylene (PP), polystyrene (PS) and poly(vinyl chloride) (PVC). Examples of barrier materials include poly(vinylidene chloride) (PVDC) and its copolymers with monomer units derived from vinyl chloride, acrylate and acrylonitrile monomers. Examples of barrier materials include poly(chlorotrifluoroethylene) (PCTFE). Examples of barrier materials include hydroxyl-functional polymers such as poly(ethylene-co-vinyl alcohol) (EVOH) and poly(hydroxy amino ethers) (PHAEs). Examples of barrier materials include nitrile polymers, such as polyacrylonitrile and its copolymers with monomer units derived from acrylate, alkyl acrylate and/or styrene monomers. Examples of barrier materials include polyesters, such as poly(ethylene terephthalate) (PET; including biaxially oriented PET, such as MYLAR), poly(ethylene naphthalate) (PEN), poly(trimethylene terephthalate) (PTT), and poly(lactic acid) (PLA). Examples of barrier materials include polyamides, such as nylon-6, nylon-6,6 and MXD-6. Examples of barrier materials include siloxanes, such as silicone rubber. Examples of barrier materials include rubbers, such as vulcanized polyolefins and chlorosulfonated polyethylene (CSPE, such as HYPALON, DuPont). Examples of barrier materials include liquid crystalline polymers (LCPs).

Examples of barrier materials also include blends and copolymers of the polymers listed above. In addition, a barrier material may include a filler, such as reinforcing fibers or nanomaterials, which may improve the mechanical and/or barrier properties of the material. Examples of barrier materials including nanomaterials include clay-based films, such as laminated clay crystal nanolayers (LCM-AIST) and Claist. A barrier material may be present in the flexible layer 110 as a distinct layer, or it may be present in a mixture with another material, such as a fabric.

The flexible layer 110 may be a multi-layer material, including layers of two different materials attached to each other. For example, a multi-layer flexible layer may include a first layer coated with a second layer. For a multi-layer flexible layer that includes two or more layers, at least one of the layers is preferably a barrier material. More preferably, at least one of the layers is a barrier material, and at least one of the layers is a fabric. Examples of multi-layer materials that include a barrier material include coated polyamides, such as polyurethane coated nylon, neoprene coated nylon, polyester coated nylon, LDPE coated nylon, and coextruded polyolefin and nylon (i.e. Combitherm). Examples of multi-layer materials that include a barrier material include polymers coated with an inorganic layer, such as a layer of metal, glass or ceramic. Examples of multi-layer materials that include a barrier material include polymers coated with a carbon layer.

The composite layer 120 includes an elastomer matrix 122, a plurality of first capsules 124 including a polymerizer, and a corresponding activator for the polymerizer. The composite layer 120 optionally may include other ingredients, such as adhesion promoters, stabilizers, particulate fillers, reinforcing fibers, antioxidants, flame retardants, plasticizers, solvents, viscosity modifiers, colorants and dyes, odorants, blowing agents and co-catalysts. The composite layer 120 may provide self-healing and/or self-sealing properties to the laminate material 100. A failure in the laminate material, such as a puncture or a tear, may cause one or more first capsules 124 to rupture, releasing polymerizer into the failure site. Contact of the polymerizer with the corresponding activator can form a polymer in the puncture or tear, restoring some or all of the integrity of the laminate at that location.

Preferably the composite layer 120 is as thin as possible, so that the mechanical properties of the laminate are similar or identical to those of the flexible layer. An increase in the thickness of the composite layer 120 may decrease the flexibility of the laminate material. A minimum thickness of the composite layer may depend on the dimensions of the first capsules 124, or on the dimensions of other ingredients in the composite layer. In some systems, the self-healing performance of the laminate is related to the thickness of the composite layer. In these cases, there may be a trade-off be required between the mechanical properties of the laminate and the self-healing properties of the laminate.

The elastomer matrix 122 of the composite layer can provide elastomeric properties to the composite layer. Preferably the composite layer is sufficiently flexible and elastomeric that it can withstand normal use conditions of the laminate material 100 and still maintain its self-healing properties. For example, a self-healing composite layer may be able to withstand a strain of more than 10% without delamination or rupturing of microcapsules in the layer. Preferably a self-healing composite layer can withstand a strain of more than 20% without delamination or rupturing of microcapsules in the layer, more preferably can withstand a strain of more than 30% without delamination or rupturing of microcapsules in the layer, more preferably can withstand a strain of more than 40% without delamination or rupturing of microcapsules in the layer, and more preferably can withstand a strain of more than 50% without delamination or rupturing of microcapsules in the layer.

The elastomer matrix 122 may include any elastomer into which the first capsules 124 may be dispersed. Elastomers may be insoluble, infusible networks, or they may be thermoplastic elastomers, which can be thermally re-processed. Elastomers may be polymers, copolymers, block copolymers, or polymer blends. See, for example, Geoffrey Holden, "Elastomers, Thermoplastic" *Encyclopedia of Polymer Science and Technology*, John Wiley & Sons, 2002.

Examples of elastomer polymers may include polyolefins, polysiloxanes, polychloroprene, and polysulfides. Examples of polyolefin elastomers include polyisoprene (including natural rubber), polyisobutylene, polybutadiene, poly(cyclooctadiene), and poly(norbornene). Examples of polysiloxane elastomers include poly(dimethyl siloxane), poly(methyl siloxane), partially alkylated poly(methyl siloxane), poly (alkyl methyl siloxane) and poly(phenyl methyl siloxane). Examples of polysulfide elastomers include crosslinked poly [bis(ethylene oxy)-2-disulfide] (Thiokol).

Examples of copolymer elastomers may include polyolefin copolymers and fluorocarbon elastomers. Examples of polyolefin copolymer elastomers include copolymers containing monomer units derived from ethylene, propylene, isoprene, isobutylene, butadiene and/or other dienes, and which may also contain monomer units derived from non-olefins, such as acrylates, alkylacrylates and acrylonitrile. Specific examples of polyolefin copolymer elastomers include ethylene-propylene-diene copolymer (EPDM), butadiene-acrylonitrile copolymer (nitrile rubber, NBR), isobutylene-isoprene copolymer (butyl rubber) and ethylene-acrylate copolymers. Examples of fluorocarbon elastomers include copolymers containing monomer units derived from hexafluoropropylene, vinylidene fluoride, tetrafluoroethylene and/or perfluoromethylvinylether.

Examples of block copolymer elastomers may include acrylonitrile block copolymers, polystyrene block copolymers, polyolefin block copolymers, polyester block copolymers, polyamide block copolymers, and polyurethane block copolymers. Examples of acrylonitrile block copolymer elastomers include styrene-acrylonitrile (SAN), and acrylonitrile-styrene-acrylate. Examples of polystyrene block copolymer elastomers include block copolymers of polystyrene, poly(α-methylstyrene) or other substituted polystyrenes with polyolefin elastomers, polyolefin copolymer elastomers, polysiloxanes or poly(alkylacrylates). A specific example includes styrene-butadiene copolymer (SBR). Examples of polyolefin block copolymer elastomers include block copolymers of polyethylene or isotactic polypropylene with poly(α-olefins) or polyolefin copolymer elastomers. Examples of polyester block copolymer elastomers include block copolymers of polyesters with polyethers. Examples of polyamide block copolymer elastomers include block copolymers of polyamides with polyesters or polyethers. Examples of polyurethane block copolymer elastomers include block copolymers of polyurethanes with polyethers or polyesters.

Examples of polymer blend elastomers include mixtures of polypropylene with polyolefin elastomers, polyolefin copolymer elastomers, polyolefin block copolymer elastomers, polypropylene copolymers or poly(ethylene-co-vinyl acetate). Examples of polymer blend elastomers include mixtures of butadiene-acrylonitrile copolymer elastomer (NBR) with polyamides or poly(vinyl chloride). Examples of polymer blend elastomers include mixtures of polysiloxane elastomers with polyesters or polyamides. Examples of polymer blend elastomers include mixtures of polyacrylates with polyolefins or with block copolymer elastomers containing blocks of polyurethanes, polyamides, or polyesters. Examples of polymer blend elastomers include mixtures of polyesters with EPDM. Examples of polymer blend elastomers include mixtures of polystyrene or polypropylene with block copolymer elastomers containing polystyrene blocks. One or more of the polymers in a polymer blend may be crosslinked to provide an interpenetrating network.

The elastomer matrix may include more than one type of elastomer. In addition, the elastomer may be modified, for example by crosslinking, by chemical modification to introduce or to protect functional groups, by grafting of polymer chains, or by surface treatments. The elastomer matrix can include other ingredients in addition to the elastomer. For example, the matrix can contain stabilizers, antioxidants, flame retardants, plasticizers, colorants and dyes, odorants, particulate fillers, reinforcing fibers, and adhesion promoters.

The first capsules 124 include a polymerizer. The polymerizer contains a polymerizable substance such as a monomer, a prepolymer, or a functionalized polymer having two or more reactive groups. The polymerizer optionally may contain other ingredients, such as other monomers and/or prepolymers, stabilizers, solvents, viscosity modifiers such as polymers, inorganic fillers, odorants, colorants and dyes, blowing agents, antioxidants, and co-catalysts. A polymerizer also may contain one part of a two-part catalyst, with a corresponding initiator being the other part of the two-part catalyst. The polymerizer preferably is capable of flowing when a puncture or tear in the composite layer 120 contacts a first capsule. Preferably, the polymerizer is a liquid.

The polymerizable substance of the polymerizer may be a monomer, a prepolymer, or a functionalized polymer having two or more reactive groups. For example, a polymerizer may include a polymerizable substance that includes reactive groups such as alkene groups, epoxide groups, amine groups, phenol groups, aldehyde groups, hydroxyl groups, carboxylic acid groups, and/or isocyanate groups. Examples of polymerizable substances also include lactones (such as caprolactone) and lactams, which, when polymerized, will form polyesters and nylons, respectively.

Examples of polymerizable substances include functionalized siloxanes, such as siloxane prepolymers and polysiloxanes having two or more reactive groups. Functionalized siloxanes include, for example, silanol-functional siloxanes, alkoxy-functional siloxanes, and allyl- or vinyl-functional siloxanes. Self-healing materials that include functionalized siloxanes as polymerizers are disclosed, for example, in U.S. Patent Application Publication 2006/0252852 A1 with inventors Braun et al., published Nov. 9, 2006; and in U.S. Patent Application Publication 2007/0166542 A1 with inventors Braun et al., published Jul. 19, 2007.

Examples of polymerizable substances also include alkene-functionalized monomers, prepolymers or polymers. Examples of alkene-functionalized polymerizers include monomers such as acrylates; alkylacrylates including methacrylates and ethacrylates; olefins including styrenes, isoprene, butadiene, and α-olefins; cyclic olefins including dicyclopentadiene (DCPD), norbornene and cyclooctadiene; acrylonitrile; and halogenated alkenes including hexafluoropropylene, vinylidene fluoride, tetrafluoroethylene and perfluoromethylvinylether. Examples of alkene-functionalized polymerizers also include diallyl phthalate (DAP), diallyl isophthalate (DAIP), triallyl isocyanurate, hexane dioldiacrylate (HDDA), trimethylol propanetriacrylate (TMPTA), and epoxy vinyl ester prepolymers and polymers.

A polymerizer may contain a multi-part polymerizer, in which two or more different substances react together to form a polymer when contacted with an activator. Examples of polymers that can be formed from multi-part polymerizer systems include polyethers, polyesters, polycarbonates, polyanhydrides, polyamides, formaldehyde polymers (including phenol-formaldehyde, urea-formaldehyde and melamineformaldehyde), and polyurethanes. For example, a polyurethane can be formed by the reaction of one compound containing two or more isocyanate functional groups (—N=C=O) with another compound containing two or more hydroxyl functional groups (—OH). Block copolymers also can be formed from multi-part polymerizer systems, in which two or more types of prepolymers each contain at least one functional group that can react to form chemical bonds between the different types of prepolymers, such that the prepolymers are converted to blocks within the block copolymer.

Examples of multi-part polymerizers include epoxide-functionalized monomers, prepolymers or polymers, which may form an epoxy polymer when contacted with amine groups. Examples of epoxide-functionalized polymerizers include diglycidyl ethers of bisphenol A (DGEBA), such as EPON® 828; diglycidyl ethers of bisphenol F (DGEBF), such as EPON® 862; tetraglycidyl diaminodiphenyl-methane (TGDDM); and multi-glycidyl ethers of phenol formaldehyde novolac polymers, such as SU-8. Self-healing materials that include epoxide-functionalized polymerizers are disclosed, for example, in PCT Application No. PCT/US2008/081291, entitled "Solvent-Promoted Self-Healing Materials" filed Oct. 27, 2008.

Preferably the polymerizer is a polymerizer for an elastomer. Since the matrix contains an elastomer, it is preferable for the polymer formed in a puncture or tear in the composite layer to be an elastomer as well. For example, the polymerizer may include a monomer, a mixture of monomers, and/or a prepolymer that, when polymerized, forms an elastomer polymer or copolymer elastomer as described above. In another example, the polymerizer may be a multi-part polymerizer for a block copolymer elastomer.

Preferably the elastomer formed from the polymerizer contains monomer units having chemical structures similar to monomer units in the elastomer of the matrix 122. If the elastomer of the matrix includes a block copolymer, the elastomer formed from the polymerizer preferably contains at least one block having a chemical structure similar to at least one block in the elastomer of the matrix. In one example, for a composite layer having an elastomer matrix containing styrene-butadiene block copolymer, the polymerizer may contain butadiene. More preferably, the elastomer formed from the polymerizer has a chemical structure that is similar to the chemical structure of the elastomer of the matrix. More preferably, the elastomer formed from the polymerizer has a chemical structure that is identical to the chemical structure of the elastomer of the matrix.

One example of a polymerizer for an elastomer is a siloxane polymerizer, which may form a polysiloxane elastomer when contacted with a corresponding activator. A polysiloxane elastomer formed from a siloxane polymerizer may be a linear or branched polymer, it may be a crosslinked network, or it may be a part of a block copolymer containing segments of polysiloxane and another polymer. Examples of polysiloxane elastomers include poly(dimethyl siloxane), poly(methyl siloxane), partially alkylated poly(methyl siloxane), poly(alkyl methyl siloxane) and poly(phenyl methyl siloxane). Preferably, the siloxane polymerizer forms poly(dimethyl siloxane), referred to as "PDMS." A siloxane polymerizer for PDMS may include a monomer, such as the cyclic siloxane monomer octamethylcylotetrasiloxane. A siloxane polymerizer for PDMS may include a functionalized siloxane, such as a prepolymer or a polymer containing dimethyl siloxane repeating units and two or more reactive groups.

A siloxane polymerizer may contain a multi-part polymerizer, in which two or more different substances react together to form a polysiloxane elastomer when contacted with an activator. In one example of a multi-part polymerizer, at least one part of the polymerizer can be a polymer containing two or more functional groups. For example, a silanol-functional polysiloxane can react with an alkoxy-functional polysiloxane to form a polysiloxane elastomer network. In the reaction of hydroxyl terminated polydimethylsiloxane (HOPDMS) with polydiethoxysiloxane (PDES), an activator such as dibutyltin dilaurate provides for elimination of ethanol and formation of a polydimethylsiloxane elastomer network, as illustrated in the following reaction scheme:

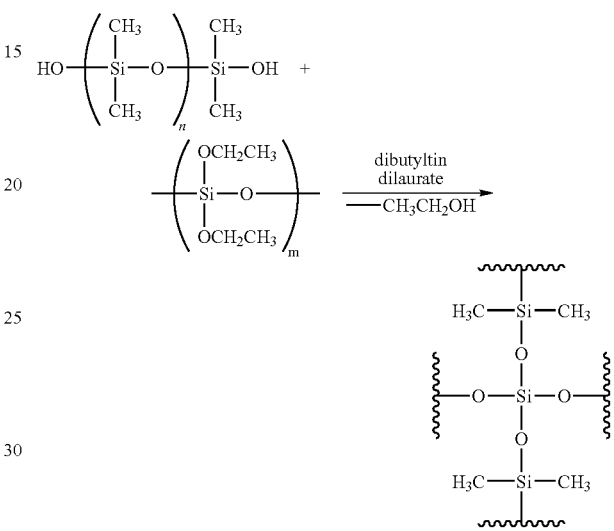

The polymerizer is present in the composite layer 120 in the plurality of first capsules 124. The first capsules can keep the polymerizer isolated from the activator and from the environment in which the composite layer is made and/or used. Preferably the first capsules isolate the polymerizer until the composite layer is subjected to a puncture or tear, at which point the liquid from first capsules intersecting the puncture or tear is released into the puncture or tear site. The first capsules have an aspect ratio of from 1:1 to 1:10, preferably from 1:1 to 1:5, more preferably from 1:1 to 1:3, more preferably from 1:1 to 1:2, and more preferably from 1:1 to 1:1.5.

In one example, the first capsules 124 may have an average diameter of from 10 nanometers (nm) to 1 millimeter (mm), more preferably from 30 to 500 micrometers, and more preferably from 50 to 300 micrometers. In another example, the first capsules may have an average diameter less than 10 micrometers. First capsules having an average diameter less than 10 micrometers may be useful for laminate materials in which the self-healing composite layer is very thin. Capsules having an average outer diameter less than 10 micrometers, and methods for making these capsules, are disclosed, for example, in U.S. Patent Application Publication No. 2008/0299391 A1 with inventors White et al., published Dec. 4, 2008.

The first capsules 124 may be hollow, having a capsule wall enclosing an interior volume containing the polymerizer. The thickness of the capsule wall may be, for example, from 50 nm to 10 micrometers. For first capsules having an average diameter less than 10 micrometers, the thickness of the capsule wall may be from 30 nm to 150 nm, or from 50 nm to 90 nm. The selection of capsule wall thickness may depend on a variety of parameters, such as the nature of the elastomer matrix, and the conditions for making and using the composite layer. For example, capsule walls that are too thick may not rupture when a puncture or tear approaches, while capsule walls that are too thin may break during processing.

Hollow capsules may be made by a variety of techniques, and from a variety of materials. Examples of materials from which the capsules may be made, and the techniques for making them, include: polyurethane, formed by the reaction of isocyanates with a diol; urea-formaldehyde (UF), formed by in situ polymerization; gelatin, formed by complex coacervation; polyurea, formed by the reaction of isocyanates with a diamine or a triamine, depending on the degree of crosslinking and brittleness desired; polystyrene or polydivinylbenzene, formed by addition polymerization; and polyamide, formed by the use of a suitable acid chloride and a water soluble triamine. For capsules having an average diameter less than 10 micrometers, the capsule formation may include polymerizing the capsule starting materials while the reaction mixture is in the form of a microemulsion.

The corresponding activator and the elastomer matrix 122 may be a homogeneous mixture. The corresponding activator may be present as a phase separated solid in the elastomer matrix 122. If the corresponding activator is phase separated from the elastomer matrix, it may be present as a solid in the elastomer matrix, or it may be present in a plurality of second capsules. In one example, the corresponding activator is a catalyst used in the formation of the elastomer matrix. The catalyst may be retained in the elastomer matrix, and may be available to contact the polymerizer when a first capsule ruptures.

Figure 2:
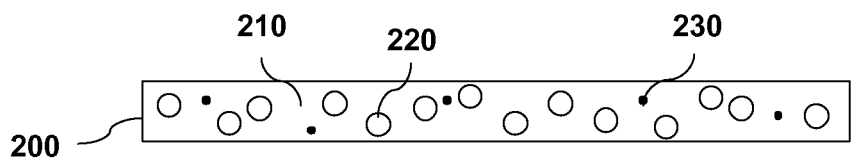
FIG. 2 is a schematic representation of a self-healing composite layer that includes an elastomer matrix, a plurality of first capsules including a polymerizer, and a corresponding activator for the polymerizer.

FIG. 2 is a schematic representation of a self-healing composite layer 200 that includes an elastomer matrix 210, a plurality of first capsules 220 including a polymerizer, and a corresponding activator 230 for the polymerizer. The elastomer matrix and the first capsules may be as described above. The corresponding activator 230 is present as a phase separated solid in the elastomer matrix 210, or it may be homogeneously mixed with the elastomer matrix.

Figure 3:
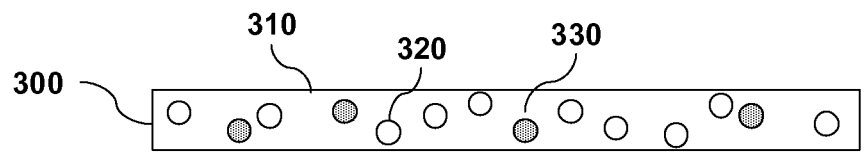
FIG. 3 is a schematic representation of a self-healing composite layer that includes an elastomer matrix, a plurality of first capsules including a polymerizer, and a plurality of second capsules including a corresponding activator for the polymerizer.

FIG. 3 is a schematic representation of a self-healing composite layer 300 that includes an elastomer matrix 310, a plurality of first capsules 320 including a polymerizer, and a plurality of second capsules 330 including a corresponding activator for the polymerizer. The second capsules 330 can keep the activator isolated from the polymerizer and from the environment in which the composite layer 300 is made and/or used. Second capsules 330 that include the activator may also include other ingredients, such as stabilizers, solvents, viscosity modifiers such as polymers, inorganic fillers, odorants, colorants and dyes, blowing agents, antioxidants and co-catalysts. If the polymerizer is a multi-part polymerizer, then one of the polymerizable substances may be present in the second capsules 330 with the activator, as long as the polymerizable substance does not consume the activator.

If present, the second capsules 330 preferably have an average diameter of from 10 nm to 1 mm, more preferably from 30 to 500 micrometers, more preferably from 50 to 300 micrometers. The second capsules may have an average diameter less than 10 micrometers. Second capsules having an average diameter less than 10 micrometers may be useful for laminate materials in which the self-healing composite layer is very thin. The second capsules may have an aspect ratio of from 1:1 to 1:10, preferably from 1:1 to 1:5, more preferably from 1:1 to 1:3, more preferably from 1:1 to 1:2, more preferably from 1:1 to 1:1.5. The second capsules may be hollow, having a capsule wall enclosing an interior volume containing the activator. Hollow capsules having a capsule wall enclosing an interior volume may have wall thickness from 50 nm to 10 micrometers. For second capsules having an average diameter less than 10 micrometers, the thickness of the capsule wall may be from 30 nm to 150 nm, or from 50 nm to 90 nm. The selection of capsule wall thickness may depend on the elastomer matrix in the composite layer, as noted above for the first capsules.

Second capsules 330 may be particles containing a mixture of the activator and an encapsulant. These particles may be made by a variety of techniques, and from a variety of materials. For example, small particles or a powder of the activator may be dispersed into a liquid containing the encapsulant, followed by solidification of the mixture of encapsulant and activator. Particles of the protected activator in an encapsulant are preferably microparticles having an average diameter of at most 500 micrometers. The encapsulant is soluble or swellable in the polymerizer, and is a solid at room temperature. The polymerizer may dissolve the encapsulant, releasing the activator and forming a polymer. The polymerizer may swell the encapsulant so that the particle can be penetrated by the polymerizer sufficiently to allow polymerization of the polymerizer when it contacts the activator. Encapsulants and their use in capsules containing activators are described, for example, in U.S. Patent Application Publication No. 2005/0250878 A1 with inventors Moore et al., published Nov. 10, 2005.

Examples of corresponding activators include activators for the reaction of silanol-functional siloxanes with alkoxy-functional siloxanes, such as catalysts that promote silanol condensation or the reaction of silanol with alkoxy-functional siloxane groups. Examples of these catalysts include amines and include metal salts, where the metal can be lead, tin, zirconium, antimony, iron, cadmium, calcium, barium, manganese, bismuth or titanium. Specific examples of amines include amine compounds, such as n-hexylamine and cyclohexylamine; and amine salts, such as hexylamine hydrochloride, butylamine acetate and guanidine diethylhexoate. Metal salts include, for example, metal salts of carboxylic acids. Specific examples of metal salts include carboxylic acid salts of tin, such as dibutyltin dilaurate, dibutyltin diacetate, tin(II) octoate, tin(II)neodecanoate, tin(II)oleate, dibutyltin diisooctylmaleate, dibutyltin didodecanoate, di-n-butylbutoxychlorotin, dimethyltin dineodecanoate, dioctyltin dilaurate, dibutyldimethoxystannane, bis(acetoxydibutyltin)oxide, tetrakis(acetoxydibutyltinoxy)silane, 4,4,8,8-tetrabutyl-2,2,6,6-tetraethoxy-1,3,5,7-tetraoxa-2,6-di-sila-4,8-distannocane, α-ethyl-ω-acetoxy poly(diethoxysiloxaneoxydibutyl stannanediyl), and di-n-butylbis(2-ethylhexanoate)tin. Specific examples of metal salts also include carboxylic acid salts of lead, such as lead laurate; carboxylic acid salts of cobalt, such as cobalt naphthenate; and carboxylic acid salts of titanium, such as tetrabutyl titanate, tetraoctyl titanate, tetraisopropyl titanate, titanium di-n-butoxide bis(2,4-pentanedionate), titanium diisopropoxide bis(2,4-pentanedionate), and titanium diisopropoxide bis(ethylacetoacetate).

Examples of corresponding activators include activators for the polymerization of hydrosilanes and/or hydrosiloxanes, optionally with organic polymerizers containing an unsaturated group. Examples of these catalysts include platinum catalysts, such as Karstedt's catalyst, and palladium catalysts.

Examples of corresponding activators include activators that can react with two or more epoxy functional groups. For example, an epoxy polymer can be formed by the reaction at or below room temperature (25° C.) of one compound containing two or more epoxy functional groups with another compound containing either at least one primary amine group or at least two secondary amine groups. In these systems, the amine compound can be present in a composite layer as the activator for an epoxy functionalized polymerizer.

Examples of corresponding activators include catalysts for polymerizable cyclic olefins, including ring opening metathesis polymerization (ROMP) catalysts such as Schrock catalysts and Grubbs catalysts. Examples of corresponding activators include catalysts for lactones and lactams, including cyclic ester polymerization catalysts and cyclic amide polymerization catalysts such as scandium triflate.

Examples of corresponding activators include two-part activators, in which two distinct substances must be present in combination for the activator to function. In one example of a two-part activator system, one part of a catalyst may be a tungsten compound, such as an organoammonium tungstate, an organoarsonium tungstate, or an organophosphonium tungstate; or a molybdenum compound, such as an organoammonium molybdate, an organoarsonium molybdate, or an organophosphonium molybdate. The second part of the catalyst may be an alkyl metal halide, such as an alkoxyalkyl metal halide, an aryloxyalkyl metal halide, or a metaloxyalkyl metal halide in which the metal is independently tin, lead, or aluminum; or an organic tin compound, such as a tetraalkyltin, a trialkyltin hydride, or a triaryltin hydride.

In another example of a two-part activator system, a corresponding polymerizer may include alkene-functional polymerizers. In this example, atom transfer radical polymerization (ATRP) may be used, with one of the activator components being mixed with the polymerizable compound, and the other activator component acting as the initiator. One component can be an organohalide such as 1-chloro-1-phenylethane, and the other component can be a copper(I) source such as copper(I) bipyridyl complex. In another exemplary system, one activator component could be a peroxide such as benzoyl peroxide, and the other activator component could be a nitroxo precursor such as 2,2,6,6-tetramethylpiperidinyl-1-oxy. These systems are described in Stevens et al., *Polymer Chemistry: An Introduction*, 3rd Edition; Oxford University Press, New York, (1999), pp. 184-186.

In another example of a two-part activator system, a corresponding polymerizer may contain isocyanate functional groups (—N=C=O) and hydroxyl functional groups (—OH), which can react to form a urethane linkage (—NH—C(=O)—O—). In this system, condensation polymerization may be used, with one of the activator components being mixed with the polymerizer, and the other activator component acting as the initiator. For example, one component could be an alkylating compound such as stannous 2-ethylhexanoate, and the other component could be a tertiary amine such as diazabicyclo[2.2.2]octane. These systems are described in Stevens et al., *Polymer Chemistry: An Introduction*, 3rd Edition; Oxford University Press, New York, (1999), pp. 378-381.

These activator systems may be used to form polymers from polymerizable monomers and/or from prepolymers formed from the monomers. The presence of one or more prepolymers in the first capsules or in the optional second capsules may facilitate the formation of block copolymers, either through the coupling of prepolymer chains or through the polymerization of monomer from a reactive site on the prepolymer chains. In one example, the activator includes a prepolymer formed from unsaturated monomers by ATRP, such that the prepolymer has at least one polymerizable group at a chain end. Contact of the activator with a polymerizable monomer can provide for polymerization of the monomer from this group, resulting in the growth of new polymer from the end of the prepolymer. If the polymerizable monomer is different from the monomer used to prepare the prepolymer, a block copolymer can be formed. Such a system may be advantageous in healing an elastomer matrix with an elastomer such as an acrylonitrile block copolymer elastomer, a polystyrene block copolymer elastomer, or a polyolefin block copolymer elastomer.

The composite layer 120 may include one or more adhesion promoters, which may be present in the elastomer matrix 122, in the first capsules 124, and/or in the optional second capsules (i.e. 330). One type of adhesion promoter that may be present includes substances that promote adhesion between the elastomer matrix 122 and the first and/or second capsules. The adhesion between the matrix and capsules may influence whether the capsules will rupture or debond in the presence of an approaching puncture or tear. To promote the adhesion between the matrix and the capsule wall, various silane coupling agents may be used. Typically, these are compounds of the formula R—SiX$_3$, where R is preferably a reactive group R$^1$ separated by a propylene group from silicon, and X is an alkoxy group (preferably methoxy), such as R$^1$—CH$_2$CH$_2$CH$_2$Si(OCH$_3$)$_3$. Examples include the following silane coupling agents available from DOW CORNING (Midland, Mich.), with the reactive group noted in parentheses: Z6020 (Diamino); Z6030 (Methacrylate); Z6032 (Styrylamine Cationic); Z6040 (Epoxy); and Z6075 (Vinyl). To increase the adhesion between capsules and an elastomer matrix in the composite layer, the capsules may be treated by washing them in a solution of the coupling agent. For example, urea-formaldehyde capsules may be washed in a solution of silane Z6020 or Z6040 and hexane followed by adding silane Z6032 to the elastomer matrix.

Another type of adhesion promoter that may be present includes substances that promote adhesion between the elastomer matrix 122 and the polymer formed from the polymerizer when contacted with the activator. The adhesion between the matrix and this polymer may influence whether the laminate can be healed once a puncture or tear has been introduced. To promote the adhesion between the elastomer matrix and the polymer formed in the puncture or tear, various unsaturated silane coupling agents may be used. Typically, these are compounds of the formula R$^2$—SiX'X"X'", where R$^2$ is preferably an unsaturated group R$^3$ separated by a propylene group from silicon; and X', X" and X'" are independently alkyl or alkoxy, such that at least one of X', X" and X'" is an alkoxy group (preferably ethoxy), such as R$^3$—CH$_2$CH$_2$CH$_2$Si(OCH$_2$CH$_3$)$_3$. Examples include silane coupling agents available from GELEST, such as (3-acryloxpropyl)trimethoxysilane, (3-acryloxpropyl)methyldimethoxysilane, methacryloxypropyltrimethoxysilane, methacryloxypropylmethyldimethoxysilane, methacryloxypropyltriethoxysilane, methacryloxypropylmethyldiethoxysilane, 3-glycidoxypropyltrimethoxysilane, and N-2-aminoethyl-3-aminopropyl-trimethoxysilane.

Figure 4:
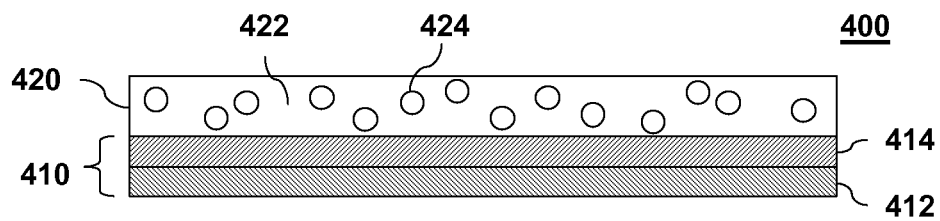
FIG. 4 is a schematic representation of a laminate material that includes a flexible layer and a self-healing composite layer in contact with the flexible layer, where the flexible layer includes at least two layers.

FIG. 4 is a schematic representation of a laminate material 400 that includes a flexible layer 410 and a self-healing composite layer 420 in contact with the flexible layer. The flexible layer 410 includes a first layer 412 and at least one additional layer 414. The composite layer 420 includes an elastomer matrix 422, a plurality of first capsules 424 including a polymerizer, and a corresponding activator for the polymerizer. The self-healing composite layer 420 may be a composite layer such as composite layer 200 or composite layer 300.

The flexible layer 410 includes at least two layers 412 and 414. In one example, one of the layers provides structural integrity to the flexible layer, and the other layer provides fluid barrier properties to the flexible layer. In another example, the layer 414 is an adhesive layer that bonds the flexible layer 410 with the self-healing composite layer 420.

In another example, the layer 412 is a mechanical barrier layer that inhibits damage to the layer 414 and the self-healing layer 420. Examples of damage that can be inhibited include damage due to radiation, temperature, and MMOD.

Figure 5:
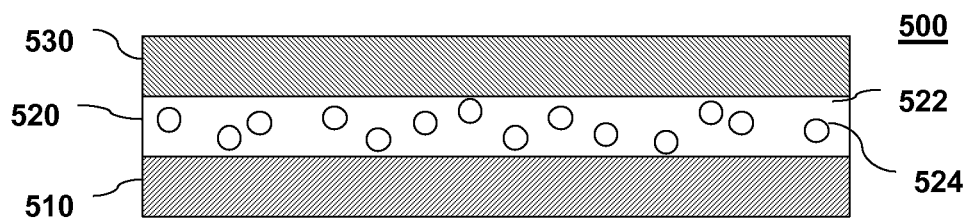
FIG. 5 is a schematic representation of a laminate material that includes a first flexible layer, a second flexible layer, and a self-healing composite layer between the flexible layers.

FIG. 5 is a schematic representation of a laminate material 500 that includes a first flexible layer 510, a second flexible layer 530, and a self-healing composite layer 520 between the first and second flexible layers. The composite layer 520 includes an elastomer matrix 522, a plurality of first capsules 524 including a polymerizer, and a corresponding activator for the polymerizer. The self-healing composite layer 520 may be a composite layer such as composite layer 200 or composite layer 300.

The first and second flexible layers 510 and 530 may be the same material, or they may be different materials. In one example, one of the flexible layers provides structural integrity to the laminate material, and the other flexible layer provides fluid barrier properties to the laminate material. In another example, one of the flexible layers is a mechanical barrier layer that inhibits damage to the laminate material, and the other flexible layer is a fluid barrier material. The first and second flexible layers 510 and 530 independently may include more than one layer. For example, one or both of the flexible layers independently may include a layer that provides structural integrity, attached to a layer that provides fluid barrier properties.

A method of making a laminate material may include contacting a first flexible layer with a self-healing composite layer, and attaching the first flexible layer and the composite layer. Attaching the first flexible layer and the composite layer may include applying heat and/or pressure to the flexible layer and composite layer. The method may further include applying an adhesive to at least one of the flexible layer and the composite layer prior to contacting the layers.

Contacting a first flexible layer with a composite layer may include applying a mixture to the first flexible layer, where the mixture includes a plurality of first capsules including a polymerizer, a corresponding activator for the polymerizer, and a matrix precursor. The contacting may further include combining ingredients including the plurality of first capsules, the corresponding activator for the polymerizer, the matrix precursor, and optionally an adhesion promoter. The contacting may further include solidifying the matrix precursor to form an elastomer matrix. The contacting may further include forming the plurality of first capsules.

Contacting a first flexible layer with a composite layer may include applying a mixture to the first flexible layer, where the mixture includes a plurality of first capsules including a polymerizer, a plurality of second capsules including a corresponding activator for the polymerizer, and a matrix precursor. The contacting may further include combining ingredients including the plurality of first capsules, the plurality of second capsules, the matrix precursor, and optionally an adhesion promoter. The contacting may further include solidifying the matrix precursor to form an elastomer matrix. The contacting may further include forming the plurality of second capsules containing the corresponding activator.

In one example, the matrix precursor includes a monomer and/or prepolymer that can polymerize to form an elastomer. The first capsules and the corresponding activator (optionally in second capsules) may be mixed with the monomer or prepolymer, and the mixture may then be contacted with the first flexible layer. The matrix precursor may then be solidified by polymerizing the monomer and/or prepolymer of the matrix precursor to form the elastomer matrix.

In another example, the matrix precursor includes a solution or dispersion of an elastomer in a solvent. The elastomer may be dissolved in a solvent to form the matrix precursor, and the first capsules and the corresponding activator (optionally in second capsules) then mixed into the matrix precursor. The mixture may then be contacted with the first flexible layer. The matrix precursor may be solidified by removing solvent from the mixture to form the elastomer matrix.

In another example, the matrix precursor includes an elastomer that is at a temperature above its melting temperature. The elastomer may be melted to form the matrix precursor and then mixed with the first capsules and the corresponding activator (optionally in second capsules). The mixture may then be contacted with the first flexible layer. The matrix precursor may be solidified by cooling the mixture to a temperature below the melt temperature of the elastomer to form the elastomer matrix.

In one example, a method of making a laminate material includes applying a mixture to a first flexible layer, where the mixture includes a plurality of first capsules including a polymerizer, a corresponding activator for the polymerizer (optionally in second capsules), and a matrix precursor; contacting the mixture with a second flexible layer; and forming a composite layer from the mixture, where the composite layer is between the first and second flexible layers. This method may further include applying an adhesive to one or both of the first and second flexible layers, prior to contacting the layers with the mixture.

In another example, a method of making a laminate material includes co-extruding a first flexible layer and a composite layer. This method may further include co-extruding a second flexible layer with the first flexible layer and the composite layer.

A laminate material that includes a flexible layer and a self-healing composite layer in contact with the flexible layer may be a self-healing and/or self-sealing laminate material. When the laminate material is subjected to a puncture or tear, the polymerizer and activator can come into contact to form a polymer in the puncture or tear site. It is desirable for the activator and the plurality of first capsules including the polymerizer to be dispersed throughout the self-healing composite layer, so that a puncture or tear will intersect one or more first capsules, which can then contact the activator. For hollow capsules, such as the first capsules and optionally the second capsules, it is desirable for the puncture or tear to break the capsules. For systems in which the activator is in a plurality of second capsules that include an encapsulant, it is desirable for the puncture or tear to expose the second capsules to the polymerizer.

Preferably a laminate material including a self-healing composite layer is self-sealing by the following "self-sealing test". A sample having dimensions of 30 mm×30 mm is pierced with a hypodermic needle having a diameter of 0.49 mm to create a puncture hole, and is then allowed to stand at room temperature for 24 hours, under no load. The sample is then sealed in a test cell with o-rings, between an input pressure chamber and an output pressure chamber. Argon is fed into the input pressure chamber on one side of the sample at 3.45 kPa/sec via an electronically controlled regulator (IP411 Omega Inc.) until an input pressure of 103 kPa is reached. Pressures on each side of the sample are continuously measured using strain gauge-based pressure transducers (PX02-MV Omega Inc.). A sample is self-sealing if it is able to withstand an input pressure of 103 kPa for at least one minute with less than a 10 kPa increase in output pressure in the output pressure chamber. A sample is non-self-sealing if the output pressure in the output pressure chamber increases to at least 50 kPa within one minute.

Preferably, when a laminate material including a self-healing composite layer is analyzed by the "self-sealing test", the material is able to withstand an input pressure of 103 kPa for at least two minutes with less than a 10 kPa increase in output pressure. More preferably, when a laminate material including a self-healing composite layer is analyzed by the "self-sealing test", the material is able to withstand an input pressure of 103 kPa for at least three minutes with less than a 10 kPa increase in output pressure. More preferably, when a laminate material including a self-healing composite layer is analyzed by the "self-sealing test", the material is able to withstand an input pressure of 103 kPa for at least four minutes with less than a 10 kPa increase in output pressure. More preferably, when a laminate material including a self-healing composite layer is analyzed by the "self-sealing test", the material is able to withstand an input pressure of 103 kPa for at least five minutes with less than a 10 kPa increase in output pressure.

The polymer formed from the polymerizer and the activator may provide for partial or full recovery of the mechanical properties of the laminate. In addition, the polymer formed from the polymerizer and the activator may be bonded to the rest of the composite layer and/or to the flexible layer. This bonding may provide for sealing of the laminate to inhibit or prevent leakage of a fluid through the laminate. Preferably the self-healing composite layer and the one or more flexible layers are wetted by the contents of the first capsules, and optionally by the contents of the second capsules. Insufficient wetting of the puncture surface may prevent bonding of the laminate with the polymer formed from the polymerizer and the activator. For systems in which the polymerizer and the activator form a polymer at ambient temperature and pressure, the laminate material may be autonomically self-sealing, since no manual intervention is required to cause healing of the self-healing composite layer.

A self-healing composite layer that includes an elastomer matrix, a plurality of first capsules including a polymerizer, and a corresponding activator for the polymerizer may be used to increase the lifetime of a flexible material. A method of increasing the lifetime of a flexible material may include contacting the flexible material with the self-healing composite layer, and attaching the flexible material and the self-healing composite layer to form a laminate material. The flexible material may be non-self-sealing as measured by the self-sealing test, and the laminate material may be self-sealing as measured by the self-sealing test.

The following examples are provided to illustrate one or more preferred embodiments of the invention. Numerous variations may be made to the following examples that lie within the scope of the invention.

EXAMPLES

Example 1

Formation of Capsules Containing Polymerizer

Urea-formaldehyde microcapsules containing a siloxane polymerizer were formed by mixing 200 mL of water and 5.0 g urea in a 600 mL beaker, followed by the addition of 0.5 g resorcinol and 0.5 g ammonium chloride. A 2.5 wt % solution of ethylene maleic anhydride copolymer (50 mL) was added to this mixture. The pH of the mixture was adjusted to 3.5 using 50 wt % NaOH and 1N HCl aqueous solutions, and the mixture was then agitated at 550 rpm. A polymerizer mixture (60 mL) was added to the stirred solution, followed by 12.67 g of a 37% aqueous formaldehyde solution. The polymerizer mixture included a relatively high viscosity silanol-terminated poly(dimethylsiloxane) (PDMS) resin (700-800 centiStokes (cSt), DOW CORNING), which was diluted with approximately 20 wt % heptane to improve encapsulability.

The temperature of the reaction mixture was raised to 55° C. and held for 2 hours with agitation, after which 50 mL of water was added to the reaction mixture. After 4 hours of agitation, the reaction mixture was cooled to room temperature, and the microcapsules were separated. The microcapsule slurry was diluted with an additional 200 mL of water and washed with water (3×100 mL). The capsules were isolated by vacuum filtration, air dried and sieved to remove aggregated capsules.

For an agitiation rate of 850 rpm, the microcapsules had an average diameter of 500 micrometers. Doubling the agitation rate to 1000 rpm reduced the average capsule diameter to approximately 400 micrometers. The average capsule diameter was further decreased by increasing the heptane content to 30 wt %. For this polymerizer mixture composition, an agitation rate of 1000 rpm yielded capsules with an average diameter of 250 micrometers.

Example 2

Formation of Capsules Containing Activator

Dibutyltin dilaurate was encapsulated within polyurethane microcapsules formed through interfacial polymerization. A urethane prepolymer was synthesized by first dissolving toluene 2,4-diisocyanate (TDI, Aldrich, 22.0 g, mp=19.5-21.5° C.) in cyclohexanone (142 g, $bp_{760}$=155.6° C.). The diol reactant, 1,4-butanediol (5.0 g), was added to this stirred mixture at 5 mL/min using a syringe pump, and the reaction mixture was stirred and heated at 80° C. for 24 hours. To avoid formation of a gel during microencapsulation, the molar ratio of TDI to 1,4-butanediol was kept less than 2.3. Once the prepolymer was formed, the cyclohexanone was evaporated under vacuum at 100° C. The urethane prepolymer had excess isocyanate functional groups, which could be reacted to form a higher molecular weight polymer through the use of a chain extender. The amount of chain extender to add was determined by titration of the isocyanate functional group in urethane prepolymer, following ASTM D2572-97.

Urethane microcapsules containing the tin catalyst were then formed by mixing the urethane prepolymer (3.0 g) and dibutyltin dilaurate (DBTL-Sn; Gelest, 1 g) in 32 g chlorobenzene, and then adding this mixture to 28.8 g of a water solution containing 15 wt % gum arabic (Aldrich, suspending agent). After stirring for 30 min at 70° C., an ethylene glycol chain extender was added to the mixture at 5 mL/min. The amount of ethylene glycol was 30 wt % relative to the urethane prepolymer. Microcapsules were obtained after 2 hours at 70° C. with mechanical stirring at 700 rpm. The average microcapsule diameter was 180 micrometers.

Example 3

Formation of Laminate Material

A composite precursor mixture was prepared by mixing the polymerizer microcapsules of Example 1, the activator microcapsules of Example 2, a PDMS matrix precursor and silica microspheres. The PDMS matrix precursor included a silanol-terminated PDMS having a viscosity of 18,000 cSt (Gelest Inc.), poly(diethoxysiloxane) (PDES; Gelest Inc.) as a crosslinker, and di-n-butyldilauryl tin as a cure catalyst. The mixture contained 25 wt % polymerizer microcapsules, 6 wt % activator microcapsules, 3 wt % PDES crosslinker, 3 wt % di-n-butyldilauryl tin, and 4 wt % silica microspheres.

A sheet of polyurethane coated nylon barrier material (ILC Dover Inc.) was cut into two 60 mm×90 mm sections. A commercial primer, Dow-Corning Primer-C, was applied to the surface of the barrier material to promote adhesion between the poly(urethane) coating of the barrier material and the PDMS of the composite material. The composite precursor mixture was degassed for 15 minutes, and then cast between the two layers of the primed barrier material. The sample was placed under a weight of approximately 1 Newton, corresponding to a pressure of 1.85 Pa, and cured at room temperature for 24 hours to provide a three-layer laminated structure with a self-healing PDMS composite in the middle. The thickness of the composite layer was dependent on the size of the silica microspheres. Microspheres having average diameters of 180-250 micrometers yielded an average composite layer thickness of 0.32 mm. Microspheres having average diameters of 250-355 micrometers yielded an average composite layer thickness of 0.50 mm. Microspheres having average diameters of 1.00 mm yielded an average composite layer thickness of 1.0 mm.

Figure 6:
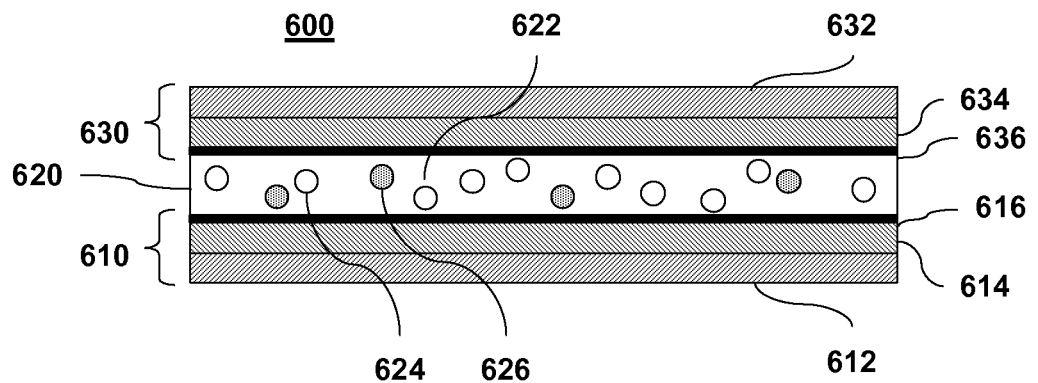
FIG. 6 is a schematic representation of a laminate material

FIG. 6 is a schematic representation of the laminate material produced. Laminate material 600 included a first flexible layer 610, a second flexible layer 630, and a self-healing composite layer 620 between the first and second flexible layers. The first flexible layer 610 included a nylon barrier layer 612, a polyurethane layer 614 and a primer layer 616. The composite layer 620 included an elastomer matrix 622, a plurality of first capsules 624 including a polymerizer, and a plurality of second capsules 626 including a corresponding activator for the polymerizer. The second flexible layer 630 included a nylon barrier layer 632, a polyurethane layer 634 and a primer layer 636.

Example 4

Testing of Laminate

Figure 7:
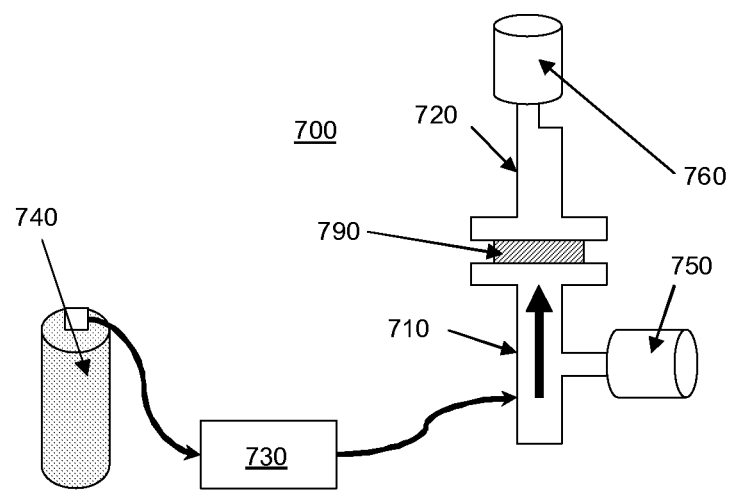
FIG. 7 is a schematic representation of a pressure test cell used to measure healing performance of laminate materials.

Samples having dimensions of 30 mm×30 mm were cut from the 60 mm×90 mm laminate of Example 3. Two different methods were used to mechanically damage the laminate samples. In one method, a hypodermic needle having a diameter of 0.49 mm, 0.90 mm, 1.27 mm, 1.67 mm or 2.40 mm was used to create a puncture hole. In another method, cut damage was simulated using a razor blade to make a 7 mm cut in the laminated sample. After the material was damaged, the laminate samples were allowed to heal for 24 hrs at room temperature, under no load. The healing performance of the laminate samples was determined by applying a gas pressure on one side of the sample, and measuring the gas pressure that was allowed to pass through the sample. FIG. 7 is a schematic representation of the pressure test cell 700 used to measure the healing performance. A sample 790 was held in the middle of the test cell sealed with o-rings between an input pressure chamber 710 and an output pressure chamber 720. Test gas 740 (argon) was fed into the input pressure chamber 710 on one side of the sample at 3.45 kPa/sec via an electronically controlled regulator 730 (IP411 Omega Inc.) until the target pressure of 103 kPa (slightly more than 1 atm) was reached. Pressures on each side of the specimen were continuously measured using strain gauge-based pressure transducers 750 and 760 (PX02-MV Omega Inc.). Data was recorded using LabView software and associated data acquisition hardware on a PC.

Figure 8:
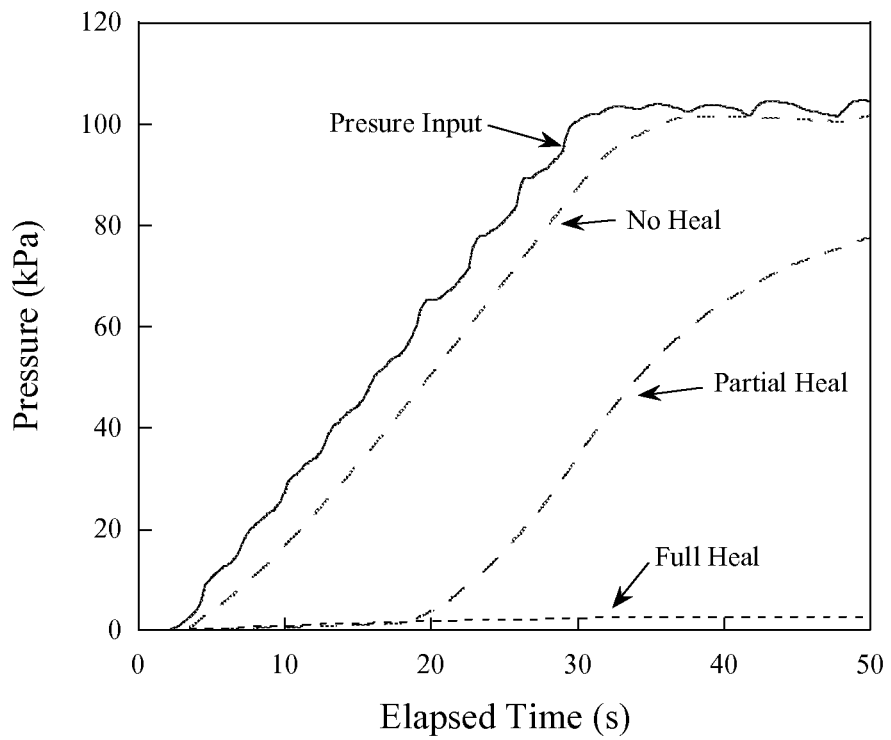
FIG. 8 is a set of representative graphs of pressure versus time for laminate materials after being subjected to a puncture.

Healing performance was characterized by one of three behaviors: no healing, partial healing, and full healing. FIG. 8 is a set of representative graphs of pressure versus time for each case. Full healing was defined as a damaged and healed membrane able to withstand a pressure difference of 103 kPa without any measurable leakage. The "Pressure Input" curve represents the pressure input increase on one side of the sample. The three curves below this represent the pressure output change on the other side of the membrane. The sample associated with the "No Heal" curve had no measurable healing. In this case, air flow was permitted through the punctured region, leading to an increase in pressure in both the input and output chambers up to 103 kPa. The sample associated with the "Full Heal" curve at the bottom of the graph exhibited full healing. In this case, as the input pressure was raised to 103 kPa, the healed sample impeded the flow of air, such that there was no measurable change in the output pressure. This pressure differential across the membrane was held for 300 seconds, and maintained a seal in every fully healed case. The small increase in pressure in the output chamber of approximately 2.4 kPa is believed to be due to the pressure difference across the flexible sample causing a slight protrusion in the sample and effectively increasing the pressure in the output chamber. The sample associated with the "Partial Heal" curve exhibited partial healing. In this case, the sample healed but ruptured before reaching the target pressure difference of 103 kPa across the sample. The output pressure of the partially healed sample was nearly constant initially, and was then followed by a rapid increase in pressure after 18 seconds. This corresponded to an input pressure of 55 kPa at rupture.

In addition to the laminate samples prepared from the laminates of Example 3, the healing behavior of other laminate samples was also investigated. Control samples were laminates in which the PDMS layer between the barrier layers included no capsules. The control samples had no measurable healing, either for punctures (0.49 mm needle diameter) or for cut damage. Comparative samples in which the PDMS layer included 6 wt % activator capsules, but no polymerizer capsules, also had no measurable healing. However, comparative samples in which the PDMS layer contained 25 wt % polymerizer capsules, but no activator microcapsules, demonstrated at least partial healing. In some cases, these samples exhibited healing comparable to that of the dual-capsule samples from the laminates of Example 3. One possible explanation for this healing behavior is that the tin catalyst used to form the PDMS matrix can be a corresponding activator for the polymerizer in the capsules.

Figure 9:
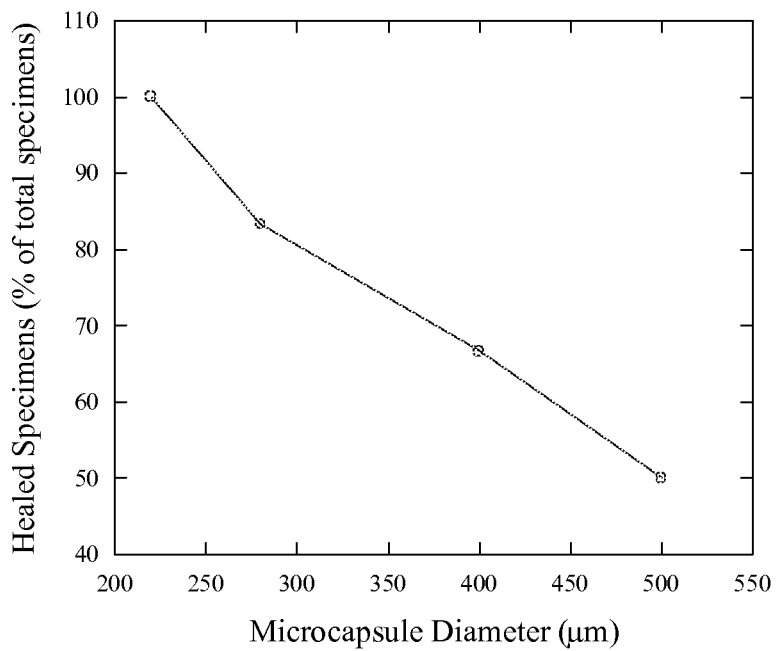
FIG. 9 is a graph of the percentage of healed samples as a function of polymerizer microcapsule diameter for self-healing laminate materials.

FIG. 9 is a graph of the percentage of healed samples as a function of polymerizer microcapsule diameter for test samples obtained from the laminates of Example 3. The test samples in this study had a PDMS composite layer thickness of approximately 1.0 mm. When the polymerizer microcapsules had a mean diameter of approximately 500 micrometers, 50% of the samples healed a puncture having a diameter of 0.49 mm. For cut damage in the same type of samples, the healing was less effective, with only 33% of samples healing. The percentage of samples healing a 0.49 mm puncture increased to 100% as the average diameter of the polymerizer microcapsules decreased to 220 micrometers. The activator capsule average diameter was kept constant at 180 micrometers for this analysis.

Figure 10:
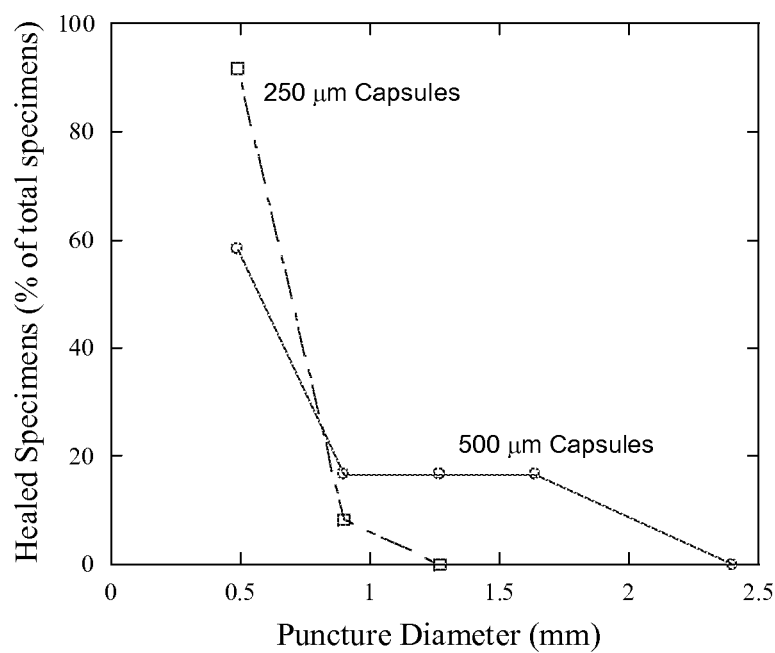
FIG. 10 is a graph of the percentage of healed samples as a function of puncture diameter for self-healing laminate materials.

FIG. 10 is a graph of the percentage of healed samples as a function of puncture diameter for the test samples obtained from the laminates of Example 3. The dashed line is for samples having polymerizer microcapsules with an average diameter of 250 micrometers, and the solid line is for samples having polymerizer microcapsules with an average diameter of 500 micrometers. An increase in puncture size led to a decrease in the percentage of healed samples. The samples having the smaller microcapsules had a high healing probability of 90% for a 0.49 mm puncture diameter, but little or no healing was observed for larger puncture holes. The samples having the larger microcapsules had a lower healing probability at smaller puncture diameters, but maintained the ability to heal at least partially for puncture diameters up to 1.63 mm. For the results illustrated in FIG. 10, the healing of punctures having diameters of 0.9 mm and 1.63 mm by samples having 500 micrometer polymerizer capsules was partial healing. These samples ruptured at input pressures of 55 kPa and 101 kPa, respectively.

Figure 11:
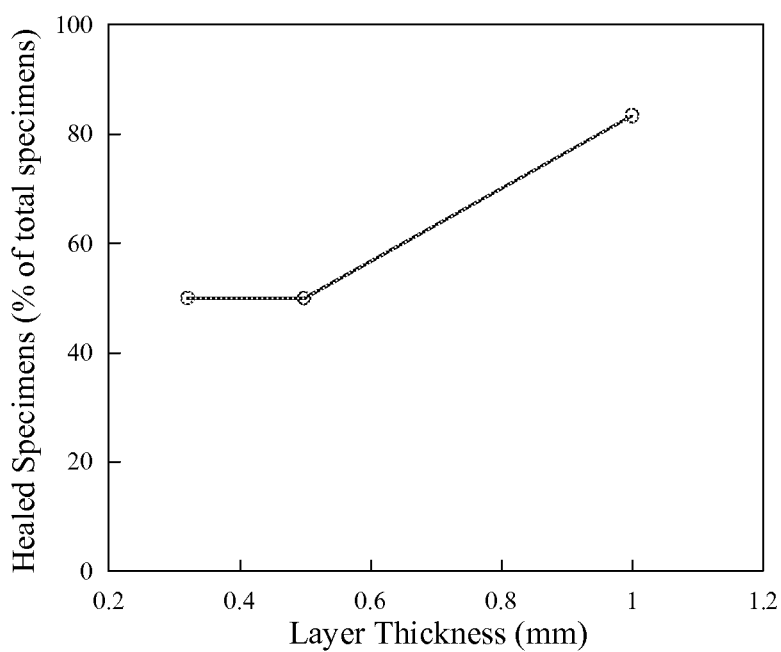
FIG. 11 is a graph of the percentage of healed samples as a function of self-healing composite layer thickness for self-healing laminate materials.

FIG. 11 is a graph of the percentage of healed samples as a function of PDMS composite layer thickness for the test samples obtained from the laminates of Example 3. A thinner composite layer may be desirable to increase the flexibility of the laminate. The samples included polymerizer capsules having an average diameter of 280 micrometers, and were subjected to a 0.49 mm puncture. Samples having thinner PDMS composite layers, 0.32 mm or 0.50 mm thick, were capable of healing in approximately 50% of the samples. Samples having thicker PDMS composite layers of 1.00 mm were capable of healing in approximately 83% of the samples.

In summary, the self-healing performance of the laminates of Example 3 was dependent on microcapsule size, puncture hole size, and the thickness of the self-healing composite layer. Maximum healing was observed for laminates where the microcapsules containing the polymerizer had an average diameter of 220 micrometer, and the healing decreased as the microcapsule diameter increased. The likelihood of healing decreased with an increase in the size of the puncture hole. Also, the likelihood of healing increased with an increase in the thickness of the self-healing composite layer.

Example 5

Puncture Surface Imaging

Figure 12A:
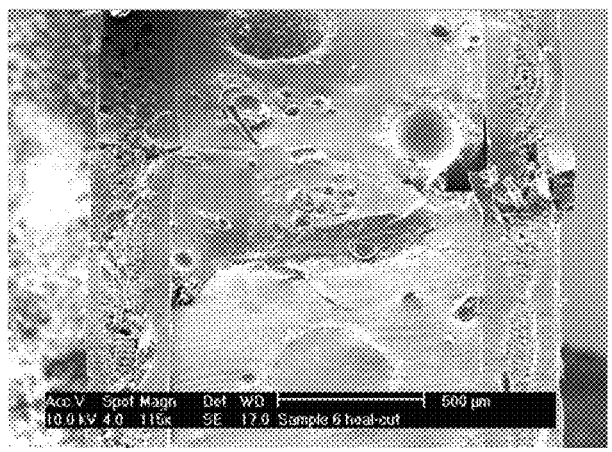
FIGS. 12A-12C are cross-sectional scanning electron microscopy (SEM) images of puncture sites for fully healed, non-healed, and partially healed laminate materials, respectively.
Figure 12B:
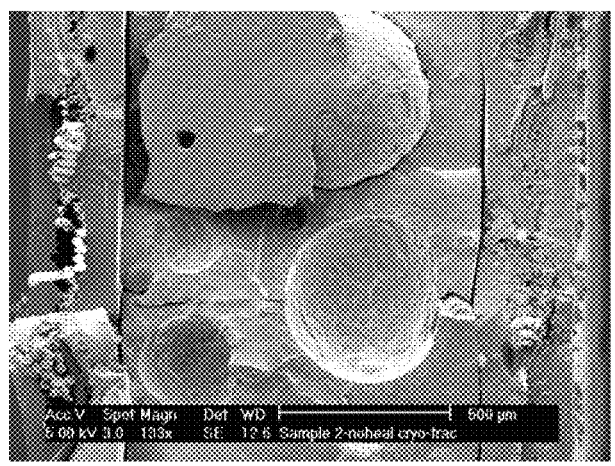
Figure 12C:
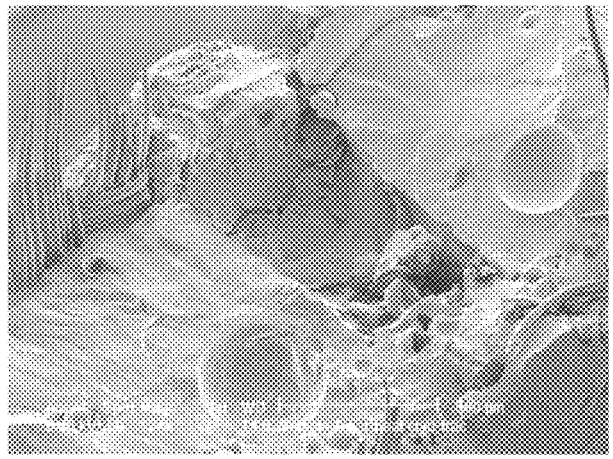

Test samples were inspected using electron and optical microscopy. FIGS. 12A, 12B and 12C are cross-sectional scanning electron microscopy (SEM) images of puncture sites for fully healed, non-healed, and partially healed samples, respectively. The images of the healed (12A) and non-healed (12B) samples were difficult to distinguish. However, the images of the partially healed sample (12C) showed a hollow depression on each side of the cross-section. This indicated that a cavity had been formed during the healing and/or testing. One possible explanation for this is that partial healing results in a heterogeneous material at the healing site, and that a portion of the material can be displaced under pressure during the testing. This would be consistent with the sharp increase in output pressure indicated by the graph in FIG. 8.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A flexible laminate material comprising:
a first flexible multilayered composite comprising a first barrier layer and a first fabric layer,
a second flexible multilayered composite comprising a second barrier layer and a second fabric layer, and
a self-healing composite layer between the first and second flexible multilayered composites, the self-healing composite layer having a thickness greater than 0.5 ram,
where the self-healing composite layer is able to withstand a strain of more than 10% without delamination and comprises:
an elastomer matrix,
a plurality of first capsules comprising a polymerizer for an elastomer and having an average diameter less than 500 micrometers, and
a plurality of second capsules comprising a corresponding activator for the polymerizer, and
where the first and second barrier layers may be the same or different, and the first and second fabric layers may be the same or different,
where the first and second fabric layers are positioned on the top and bottom sides of the laminate material,
and wherein the flexible laminate material further comprises an adhesion promoter between the first barrier layer and the self-healing composite layer and/or an adhesion promoter between the second barrier layer and the self-healing composite layer.

2. The laminate material of claim 1, where the elastomer matrix comprises at least one member selected from the group consisting of elastomer polymers, copolymer elastomers, block copolymer elastomers and polymer blend elastomers.

3. The laminate material of claim 1, where the elastomer matrix comprises a polysiloxane.

4. The laminate material of claim 1, where the polymerizer comprises a polymerizer for a polysiloxane.

5. The laminate material of claim 1, where the plurality of first capsules has an aspect ratio of 1:1 to 1:2.

6. The laminate material of claim 1, where the corresponding activator is a catalyst.

7. The laminate material of claim 1, where the corresponding activator and the elastomer matrix are a homogeneous mixture.

8. The laminate material of claim 1, where the corresponding activator is present as a phase separated solid in the elastomer matrix.

9. The laminate material of claim 1, where the plurality of second capsules has an aspect ratio of 1:1 to 1:2.

10. The laminate material of claim 1, where the first and second barrier layers, independently of one another, are selected from the group consisting of: high density polyethylene; low density polyethylene; polypropylene; polystyrene; poly(vinyl chloride); poly(vinylidene chloride); copolymers of poly(vinylidene chloride) with monomer units derived from vinyl chloride; acrylate and acrylonitrile monomers; poly(chlorotrifluoroethylene); poly(ethylene-co-vinyl alcohol); poly(hydroxy amino ethers); nitrile polymers; polyesters; polyamides; polyurethanes, siloxanes; rubbers; crystalline polymers; and blends and copolymers thereof.

11. The laminate material of claim 1, where the first and second fabric layers are the same or different polyamides.

* * * * *